United States Patent
Aikawa (10) Patent No.: US 11,881,711 B2
(45) Date of Patent: Jan. 23, 2024

(54) POWER MANAGEMENT SERVER AND POWER MANAGEMENT METHOD

(71) Applicant: KYOCERA CORPORATION, Kyoto (JP)

(72) Inventor: Shinji Aikawa, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/763,650

(22) PCT Filed: Sep. 25, 2020

(86) PCT No.: PCT/JP2020/036331
§ 371 (c)(1),
(2) Date: Mar. 25, 2022

(87) PCT Pub. No.: WO2021/060487
PCT Pub. Date: Apr. 1, 2021

(65) Prior Publication Data
US 2022/0344940 A1 Oct. 27, 2022

(30) Foreign Application Priority Data
Sep. 26, 2019 (JP) .................................. 2019-175501

(51) Int. Cl.
*H02J 3/24* (2006.01)
*H02J 3/38* (2006.01)

(52) U.S. Cl.
CPC .............. *H02J 3/241* (2020.01); *H02J 3/381* (2013.01); *H02J 2300/24* (2020.01)

(58) Field of Classification Search
CPC .. H02J 3/241; H02J 3/381; H02J 3/382; H02J 3/383; H02J 3/387; H02J 2300/24
USPC .......................................................... 307/24
See application file for complete search history.

(56) References Cited

U.S. PATENT DOCUMENTS 10,916,945 B2 * 2/2021 Kudo ....................... H02J 3/38
2014/0222239 A1 8/2014 Watanabe et al.

FOREIGN PATENT DOCUMENTS

JP 6183576 B1 8/2017
JP 2018207706 A 12/2018

* cited by examiner

*Primary Examiner* — Hal Kaplan
(74) *Attorney, Agent, or Firm* — HAUPTMAN HAM, LLP (57) ABSTRACT

A power management server includes a receiver for receiving, from an upper management server, an adjustment request for requesting a fluctuation adjustment of a frequency of a power grid for each fluctuation cycle of an adjustment target, a transmitter for transmitting, to an adjustment power supply, an adjustment instruction for instructing the fluctuation adjustment of the frequency of the power grid according to the fluctuation cycle of the adjustment target requested by the adjustment request, a management unit for managing a correspondence relationship between the fluctuation cycle of the adjustment target instructed by the adjustment instruction and the adjustment power supply, and a controller for determining an adjustment power supply to which the adjustment instruction is to be transmitted based on the correspondence relationship.

8 Claims, 10 Drawing Sheets

| FACILITY ID | EQUIPMENT ID | FLUCTUATION CYCLE OF ADJUSTMENT TARGET |
|---|---|---|
| AAA | SOLAR CELL APPARATUS | LONG CYCLE |
| AAA | POWER STORAGE APPARATUS | LONG CYCLE |
| AAA | FUEL CELL APPARATUS | LONG CYCLE |
| BBB | SOLAR CELL APPARATUS | - |
| BBB | POWER STORAGE APPARATUS | - |
| BBB | FUEL CELL APPARATUS | - |
| ... | ... | ... |

POWER MANAGEMENT SERVER AND POWER MANAGEMENT METHOD

RELATED APPLICATIONS

The present application is a National Phase of International Application Number PCT/JP2020/036331 filed Sep. 25, 2020, and claims priority to Japanese Application Numbers 2019-175501 filed Sep. 26, 2019.

TECHNICAL FIELD

The present disclosure relates to a power management server and a power management method.

BACKGROUND ART

In recent years, a technology (for example, a virtual power plant (VPP)) has been known in which a power storage apparatus is used as an adjustment power supply in order to maintain a power supply and demand balance of a power grid. In such a case, a frequency of the power grid is required to be adjusted (hereinafter, supply and demand adjustment) according to a reverse power flow supplied from a facility to the power grid. In order to enable such a supply and demand adjustment, a technology (for example, Patent Document 1) has been proposed in which the adjustment power supplies are divided into categories and an appropriate signal is transmitted for each category.

However, in the technology described above, since a fluctuation cycle of an adjustment target is merely assigned for each category, the degree of freedom of the supply and demand adjustment is small, and there is a possibility that the supply and demand adjustment cannot be appropriately performed.

CITATION LIST

Patent Literature

Patent Document 1: JP 6183576

SUMMARY

A power management server according to a first aspect includes a receiver receiving, from an upper management server, an adjustment request requesting a fluctuation adjustment of a frequency of a power grid for each fluctuation cycle of an adjustment target, a transmitter transmitting, to an adjustment power supply, an adjustment instruction for instructing the fluctuation adjustment of the frequency of the power grid according to the fluctuation cycle of the adjustment target requested by the adjustment request, a management unit for managing a correspondence relationship between the fluctuation cycle of the adjustment target instructed by the adjustment instruction and the adjustment power supply, and a controller for determining an adjustment power supply to which the adjustment instruction is to be transmitted based on the correspondence relationship.

A power management method according to a second aspect includes receiving, from an upper management server, an adjustment request for requesting a fluctuation adjustment of a frequency of a power grid for each fluctuation cycle of an adjustment target, transmitting, to an adjustment power supply, an adjustment instruction for instructing the fluctuation adjustment of the frequency of the power grid according to the fluctuation cycle of the adjustment target requested by the adjustment request, managing a correspondence relationship between the fluctuation cycle of the adjustment target instructed by the adjustment instruction and the adjustment power supply, and determining an adjustment power supply to which the adjustment instruction is to be transmitted based on the correspondence relationship.

DESCRIPTION OF EMBODIMENTS

Embodiments will be described below with reference to the drawings. Note that in the following description of the drawings, the same or similar components will be denoted by the same or similar reference signs. However, the drawings are schematic.

Embodiment

Power Management System

A power management system according to an embodiment will be described below.

Figure 1:
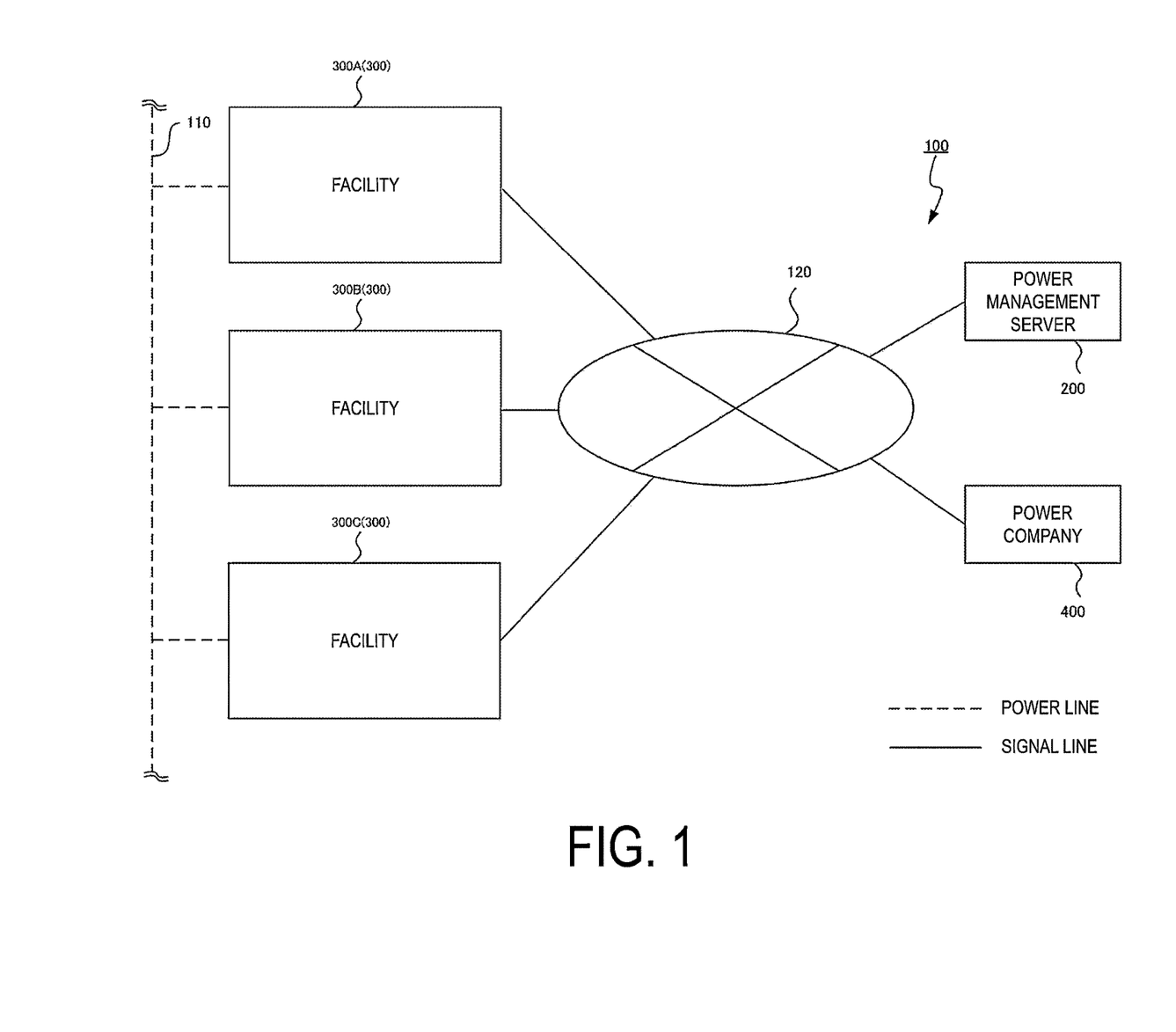
FIG. 1 is a diagram illustrating a power management system 100 according to an embodiment.

As illustrated in FIG. 1, a power management system 100 includes a power management server 200, a facility 300, and a power company 400. In FIG. 1, facilities 300A to 300C are illustrated as examples of the facility 300.

Each facility 300 is connected to a power grid 110. In the following description, the flow of power from the power grid 110 to the facility 300 is referred to as a power flow, and the flow of power from the facility 300 to the power grid 110 is referred to as a reverse power flow.

The power management server 200, the facility 300, and the power company 400 are connected to a network 120. The network 120 may provide lines between these entities. For example, the network 120 is the Internet. The network 120 may include a dedicated line such as a virtual private network (VPN).

The power management server 200 is a sever managed by a business operator, such as a power generation operator, a power transmission and distribution operator, a retailer, or a resource aggregator. The resource aggregator is an electric power provider that provides the reverse power flow to the power generation operator, the power transmission/distribution operator, the retailer, or the like in a virtual power plant (VPP). In the present embodiment, the business operator managing the power management server 200 is an example of an entity that purchases the reverse power flow.

The power management server 200 transmits, to the local controller 360 provided in the facility 300, a control message instructing control of a distributed power supply (for example, a solar cell apparatus 310, a power storage apparatus 320, or a fuel cell apparatus 330) provided in the facility 300. For example, the power management server 200 may transmit a power flow control message (for example, demand response (DR)) requesting control of the power flow and may transmit a reverse power flow control message requesting control of the reverse power flow. Further, the power management server 200 may transmit a power control message for controlling an operating state of the distributed power supply. The degree of control of the power flow or the reverse power flow may be expressed by an absolute value (for example, XX kW), or may be expressed by a relative value (for example, XX %).

Alternatively, the degree of control of the power flow or the reverse power flow may be expressed in two or more levels. The degree of control of the power flow or the reverse power flow may be represented by a power charge (RTP: real time pricing) determined by the current power supply and demand balance, and may be represented by a power charge (TOU: time of use) determined by the past power supply and demand balance.

Figure 2:
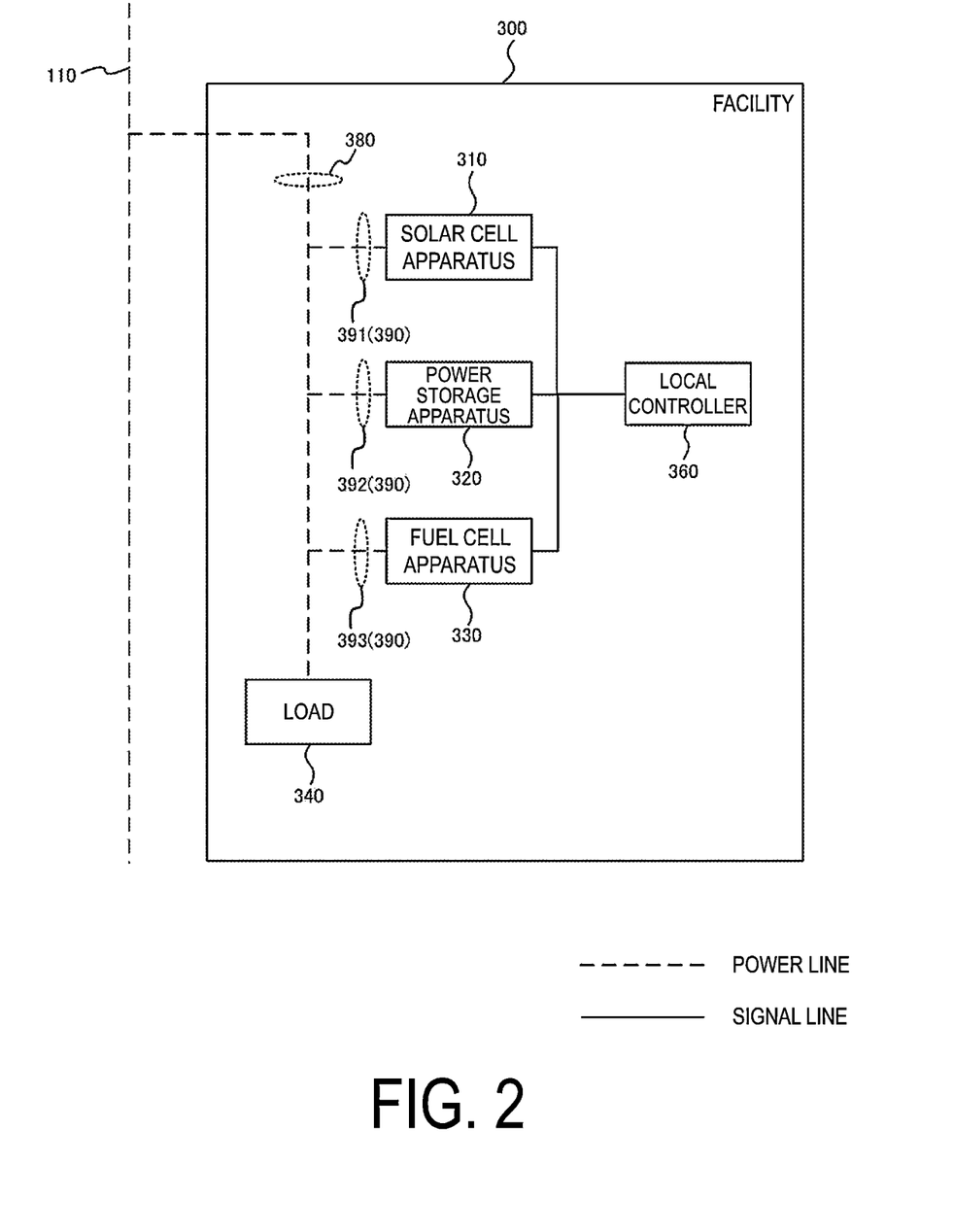
FIG. 2 is a diagram illustrating a facility 300 according to the embodiment.

The facility 300 includes the solar cell apparatus 310, the power storage apparatus 320, the fuel cell apparatus 330, the load device 340, the local controller 360, a power meter 380, and power meters 390, as illustrated in FIG. 2.

The solar cell apparatus 310 is the distributed power supply that generates power in response to sunlight or other light. The solar cell apparatus 310 may be an example of the distributed power supply to which the feed-in tariff (FIT) is applied. For example, the solar cell apparatus 310 includes a power conditioning system (PCS) and a solar panel.

Here, the power output from the solar cell apparatus 310 may vary depending on the amount of received light such as sunlight. Thus, when considering power generation efficiency of the solar cell apparatus 310, the power output from the solar cell apparatus 310 is variable power that is variable according to the amount of received light of the solar panel.

The power storage apparatus 320 is the distributed power supply that charges the power and discharges the power. The power storage apparatus 320 may be an example of the distributed power supply to which the feed-in tariff is not applied. For example, the power storage apparatus 320 includes the PCS and a power storage cell.

The fuel cell apparatus 330 is the distributed power supply that generates power using a fuel. The fuel cell apparatus 330 may be an example of the distributed power supply to which the feed-in tariff is not applied. For example, the fuel cell apparatus 330 includes the PCS and the fuel cell.

For example, the fuel cell apparatus 330 may be a solid oxide fuel cell (SOFC), a polymer electrolyte fuel cell (PEFC), a phosphoric acid fuel cell (PAFC), and a molten carbonate fuel cell (MCFC).

In the embodiment, the solar cell apparatus 310, the power storage apparatus 320, and the fuel cell apparatus 330 may be adjustment power supplies used for the VPP. The adjustment power supply is a power supply that contributes to the VPP among the distributed power supplies provided in the facility 300.

The load device 340 is a device that consumes power. For example, the load device 304 is an air conditioning device, an illumination device, an audio visual (AV) device, or the like.

The local controller 360 is an apparatus (EMS: Energy Management System) that manages power of the facility 300. The local controller 360 may control an operating state of the solar cell apparatus 310, may control an operating state of the power storage apparatus 320 provided in the facility 300, and may control an operating state of the fuel cell apparatus 330 provided in the facility 300. The details of the local controller 360 will be described later (see FIG. 4).

In the embodiment, communication between the power management server 200 and the local controller 360 is performed in accordance with a first protocol. On the other hand, communication between the local controller 360 and the distributed power supply (the solar cell apparatus 310, the power storage apparatus 320, or the fuel cell apparatus 330) is performed in accordance with a second protocol different from the first protocol. For example, as the first protocol, a protocol based on open automated demand response (ADR) or a unique dedicated protocol can be used. For example, as the second protocol, a protocol compliant with ECHONET Lite, smart energy profile (SEP) 2.0, KNX, or a unique dedicated protocol can be used. Note that the first protocol and the second protocol may be different from each other, and, for example, even if both are the unique dedicated protocols, the first protocol and the second protocol may be protocols made of different rules. However, the first protocol and the second protocol may be protocols made of the same rule.

The power meter 380 is an example of a base power meter that measures the power flow from the power grid 110 to the facility 300 and the reverse power flow from the facility 300 to the power grid 110. For example, the power meter 380 is a smart meter that belongs to the power company 400.

Here, the power meter 380 transmits, for each predetermined period (for example, 30 minutes), a message including an information element indicating an integrated value of the power flow or the reverse power flow in the predetermined period to the local controller 360. The power meter 380 may autonomously transmit the message and may transmit the message in response to a request of the local controller 360. The power meter 380 may transmit, for each predetermined period, the message including the information element indicating the power flow or the reverse power flow in the predetermined period to the power management server 200.

The power meter 390 is an example of the individual power meter that measures individual output power of the adjustment power supply. The power meter 390 may be provided at an output end of the PCS of the adjustment power supply, and may be considered to be part of the adjustment power supply. In FIG. 2, a power meter 391, a power meter 392, and a power meter 393 are provided as each of the power meters 390. The power meter 391 measures the individual output power of the solar cell apparatus 310. The power meter 392 measures the individual output power of the power storage apparatus 320. The power meter 393 measures the individual output power of the fuel cell apparatus 330.

Here, the power meter 390 transmits the message including information element indicating the individual output power of the adjustment power supply at an interval (for example, 1 minute) shorter than the predetermined period to the local controller 360. The individual output power of the adjustment power supply may be represented by an instantaneous value and may be represented by an integrated value. The power meters 390 may autonomously transmit the message and may transmit the message in response to a request of the local controller 360.

Returning to FIG. 1, the power company 400 is an entity that provides infrastructure such as the power grid 110, and is, for example, the power generation operator or the power transmission/distribution operator. The power company 400 may entrust various operations to an entity managing the power management server 200.

Power Management Server

Figure 3:
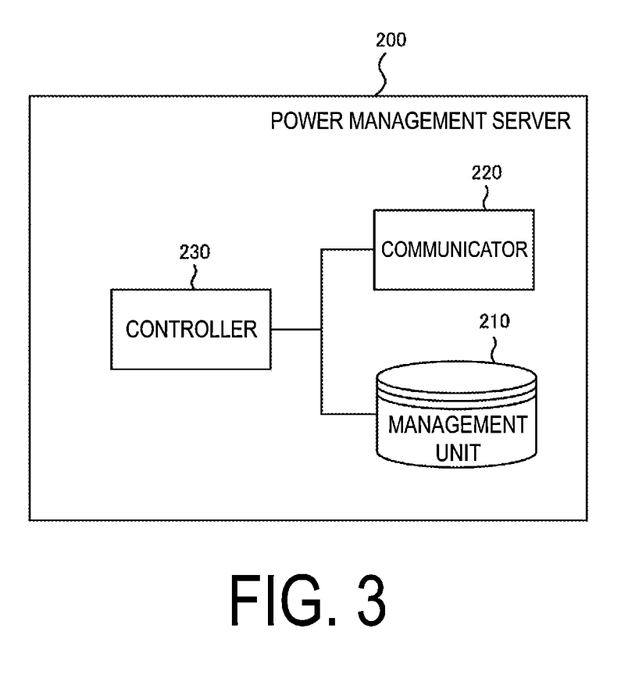
FIG. 3 is a diagram illustrating a power management server 200 according to the embodiment.

A power management server according to an embodiment will be described below. As illustrated in FIG. 3, the power management server 200 includes a management unit 210, a communicator 220, and a controller 230. The power management server 200 is an example of a virtual top node (VTN).

The management unit 210 includes a storage medium, such as a non-volatile memory and/or an HDD, and manages information on the facilities 300. For example, information relating to the facility 300 includes a type of the distributed power supply (the solar cell apparatus 310, the power storage apparatus 320, or the fuel cell apparatus 330) provided in the facility 300, specifications of the distributed power supply (the solar cell apparatus 310, the power storage apparatus 320, or the fuel cell apparatus 330) provided in the facility 300, and the like. The specifications may include a rated generated power of the solar cell apparatus 310, a rated power of the power storage apparatus 320, and a rated power of the fuel cell apparatus 330.

The communicator 220 includes a communication module, and communicates with the local controller 360 via the network 120. The communication module may be a wireless communication module compliant with standards such as IEEE 802.11a/b/g/n, ZigBee, Wi-SUN, and LTE, or may be a wired communication module compliant with standards such as IEEE 802.3.

As described above, the communicator 220 performs communication in accordance with the first protocol. For example, the communicator 220 transmits a first message to the local controller 360 in accordance with the first protocol. The communicator 220 receives the first message response from the local controller 360 in accordance with the first protocol.

The controller 230 may include at least one processor. The at least one processor may be configured of a single integrated circuit (IC) or a plurality of circuits (such as integrated circuits and/or discrete circuits) connected so as to be capable of communicating with each other.

The controller 230 controls each configuration provided in the power management server 200. For example, the controller 230 instructs the local controller 360 provided in the facility 300 to control the distributed power supply (the solar cell apparatus 310, the power storage apparatus 320, or the fuel cell apparatus 330) provided in the facility 300, by transmitting a control message. As described above, the control message may be a power flow control message, may be a reverse power flow control message, or may be a power supply control message.

Local Controller

Figure 4:
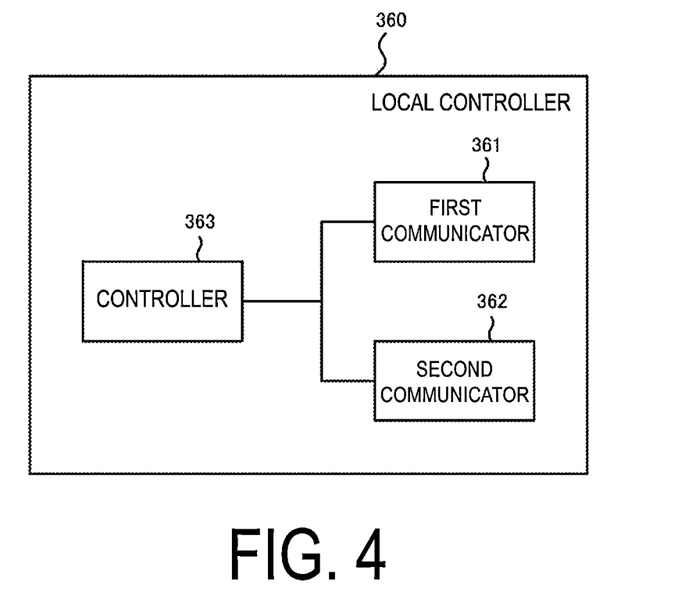
FIG. 4 is a diagram illustrating a local controller 360 according to the embodiment.

A local controller according to an embodiment will be described below. As illustrated in FIG. 4, the local controller 360 includes a first communicator 361, a second communicator 362, and a controller 363. The local controller 360 is an example of a virtual end node (VEN).

The first communicator 361 includes a communication module, and communicates with the power management server 200 via the network 120. The communication module may be a wireless communication module compliant with standards such as IEEE 802.11a/b/g/n, ZigBee, Wi-SUN, and LTE, or may be a wired communication module compliant with standards such as IEEE 802.3.

As described above, the first communicator 361 performs communication in accordance with the first protocol. For example, the first communicator 361 receives the first message from the power management server 200 in accordance with the first protocol. The first communicator 361 transmits the first message response to the power management server 200 in accordance with the first protocol.

The second communicator 362 includes a communication module, and communicates with the distributed power supply (the solar cell apparatus 310, the power storage apparatus 320, or the fuel cell apparatus 330). The communication module may be a wireless communication module compliant with standards such as IEEE 802.11a/b/g/n, ZigBee, Wi-SUN, and LTE, or may be a wired communication module compliant with standards such as IEEE 802.3, the unique dedicated protocols or the like.

As described above, the second communicator 362 performs communication in accordance with the second protocol. For example, the second communicator 362 transmits the second message to the distributed power supply in accordance with the second protocol. The second communicator 362 receives the second message response from the distributed power supply in accordance with the second protocol.

In the embodiment, the second communicator 362 constitutes a first receiver that receives at least information specifying the reverse power flow from the power meter 380. The second communicator 362 may receive information specifying the power flow from the power meter 380. The second communicator 362 constitutes a second receiver that receives information specifying each of the individual output powers of the two or more adjustment power supplies from each of the power meters 390.

The controller 363 may include at least one processor. The at least one processor may be configured of a single integrated circuit (IC) or a plurality of circuits (such as integrated circuits and/or discrete circuits) connected so as to be capable of communicating with each other.

The controller 363 controls each configuration provided in the local controller 360. Specifically, in order to control the power of the facility 300, the controller 363 instructs the device to set an operating state of the distributed power supply by transmitting the second message and receiving the second message response. In order to control the power of the facility 300, the controller 363 may instruct the distributed power supply to report information of the distributed power supply by transmitting the second message and receiving the second message response.

Fluctuation Adjustment of Frequency

A fluctuation adjustment of the frequency of the power grid 110 (hereinafter, adjustment target) according to the embodiment will be described below.

Figure 5:
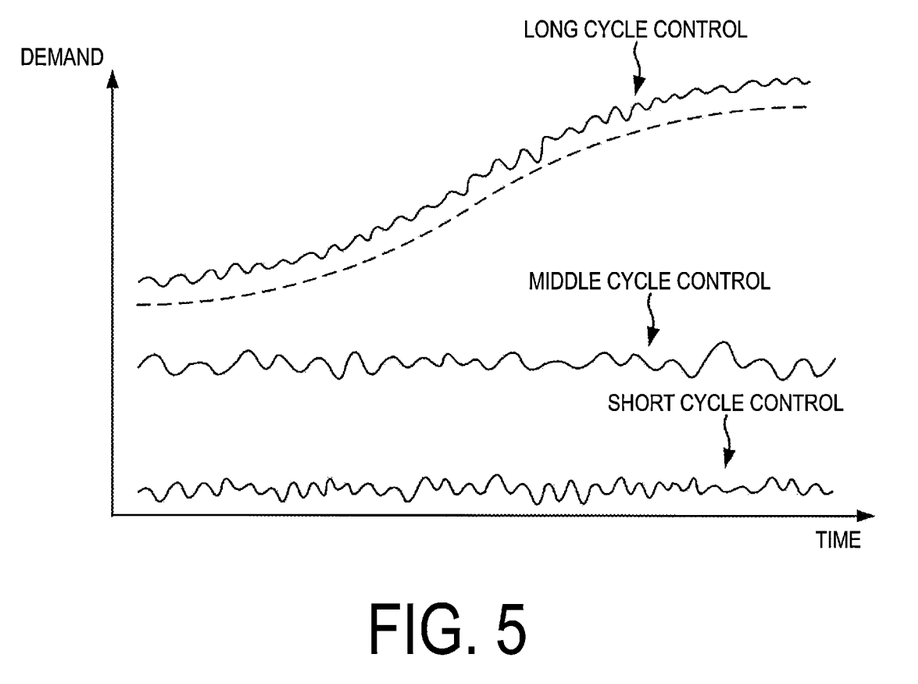
FIG. 5 is a diagram for illustrating a fluctuation adjustment of the frequency of the power grid 110 according to the embodiment.

As illustrated in FIG. 5, a control according to the fluctuation adjustment of the frequency is different for each fluctuation cycle of the adjustment target. Specifically, the control according to the fluctuation adjustment of the frequency includes a short cycle control in which the fluctuation cycle of the adjustment target is a short cycle (for example, from approximately several tens of seconds to approximately several minutes), a middle cycle control in which the fluctuation cycle of the adjustment target is a middle cycle (for example, from approximately several minutes to approximately several tens of minutes) longer than the short cycle, and a long cycle control in which the fluctuation cycle of the adjustment target is a long cycle (for example, from approximately several tens of minutes to approximately several hours) longer than the middle cycle.

Here, the short cycle control may be referred to as a governor free (GF). The short cycle control is a control to eliminate the supply and demand fluctuation which cannot be followed by the middle cycle control. For example, this supply and demand fluctuation may be caused by the operation stop of the adjustment power supply operating in the short cycle control.

The middle cycle control may be referred to as a load frequency control (LFC) and may be referred to as an automatic frequency control (AFC). The middle cycle control is a control to eliminate the supply and demand fluctuation in which a supply and demand prediction is difficult.

The long cycle control may be referred to as a dispatching power control (DPC), or may be referred to as an economic load division control (EDC). The long cycle control is a control to eliminate the supply and demand fluctuation based on the supply and demand prediction.

In such a condition, the communicator 220 of the power management server 200 constitutes a receiver receiving, from an upper management server (for example, the power company 400), an adjustment request for requesting a fluctuation adjustment of the frequency of a power grid 110 for each fluctuation cycle of the adjustment target. The communicator 220 of the power management server 200 constitutes a transmitter transmitting, to the adjustment power supply, an adjustment instruction for instructing the fluctuation adjustment of the frequency of the power grid 110 according to the fluctuation cycle of the adjustment target requested by the adjustment request. Note that the control message transmitted from the power management server 200 to the facility 300 (the local controller 360) may be considered to be an example of the adjustment instruction transmitted to the facility 300.

The management unit 210 of the power management server 200 manages a correspondence relationship between the fluctuation cycle of the adjustment target instructed by the adjustment instruction and the adjustment power supply. For example, the management unit 210 manages the correspondence relationship illustrated in FIG. 6. The correspondence relationship includes a facility ID, an equipment ID, and the fluctuation cycle of the adjustment target.

Figure 6:
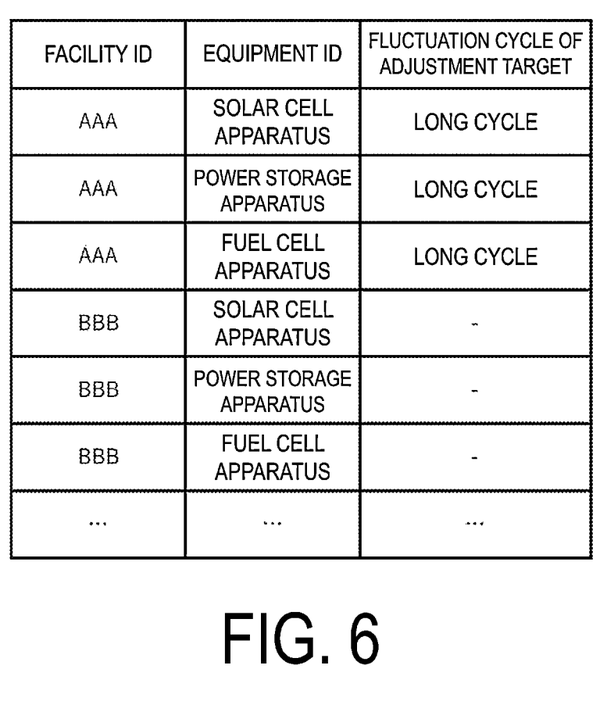
FIG. 6 is a diagram for illustrating information managed by a management unit 210 according to the embodiment.

The facility ID is an information element specifying the facility 300 including the adjustment power supply to which the adjustment instruction is transmitted. The equipment ID is an information element specifying the adjustment power supply. The equipment ID may include an information element indicating a type of the adjustment power supply, or may include an information element such as a character string individually assigned to the adjustment power supply. The fluctuation cycle of the adjustment target is a fluctuation cycle of the adjustment target instructed to the adjustment power supply by the adjustment instruction. The fluctuation cycle of the adjustment target includes the short cycle, the middle cycle, and the long cycle.

In a case where an additional adjustment of the frequency of the power grid 110 is required, the controller 230 of the power management server 200 determines the adjustment power supply to which the additional adjustment instruction is to be transmitted based on the correspondence relationship.

First, the controller 230 may determine the adjustment power supply to which the adjustment instruction has not been transmitted as an adjustment power supply to which the additional adjustment instruction is to be transmitted. For example, in a case where the adjustment instruction has been already transmitted to the adjustment power supply in the facility 300A, and the adjustment instruction has not been transmitted to the adjustment power supply in the facility 300B and the facility 300C, the controller 230 determines, from among the adjustment power supplies in the facility 300B and the facility 300C, the adjustment power supply to which the additional adjustment instruction is to be transmitted.

Second, in a case where the fluctuation cycle of the adjustment target required in the additional adjustment is a first cycle, the controller 230 may determine an adjustment power supply to which an adjustment instruction for instructing a second cycle longer than the first cycle as the fluctuation cycle of the adjustment target is transmitted as an adjustment power supply to which the additional adjustment instruction is to be transmitted. For example, in a state where the adjustment instruction of the long cycle has been already transmitted to the adjustment power supply in the facility 300A, and the adjustment instruction of the middle cycle has been already transmitted to the adjustment power supply in the facility 300B and the facility 300C, in a case where the fluctuation cycle of the adjustment target required in the additional adjustment is the middle cycle, the controller 230 determines, from among the adjustment power supplies in the facility 300A, the adjustment power supply to which the control instruction of the middle cycle is to be transmitted.

In a case where the controller 230 receives, from the upper management server (for example, the power company 400), the additional adjustment request, the controller 230 may determine that the additional adjustment is required. In a case where the controller 230 determines that the fluctuation adjustment of the frequency of the power grid 110 is insufficient based on a monitoring result of the frequency of the power grid 110, the controller 230 may determine that the additional adjustment is required. The monitoring result may be obtained by the power management server 200 directly monitoring the frequency of the power grid 110, or may be obtained from a result of monitoring the frequency of the power grid 110 by each facility 300.

Power Management Method

A power management method according to the embodiment will be described below. Here, a case is exemplified in which the adjustment instruction is transmitted for each facility 300.

First, a case will be exemplified in which the additional adjustment instruction is transmitted to an adjustment power supply to which the adjustment instruction has not been transmitted.

Figure 7:
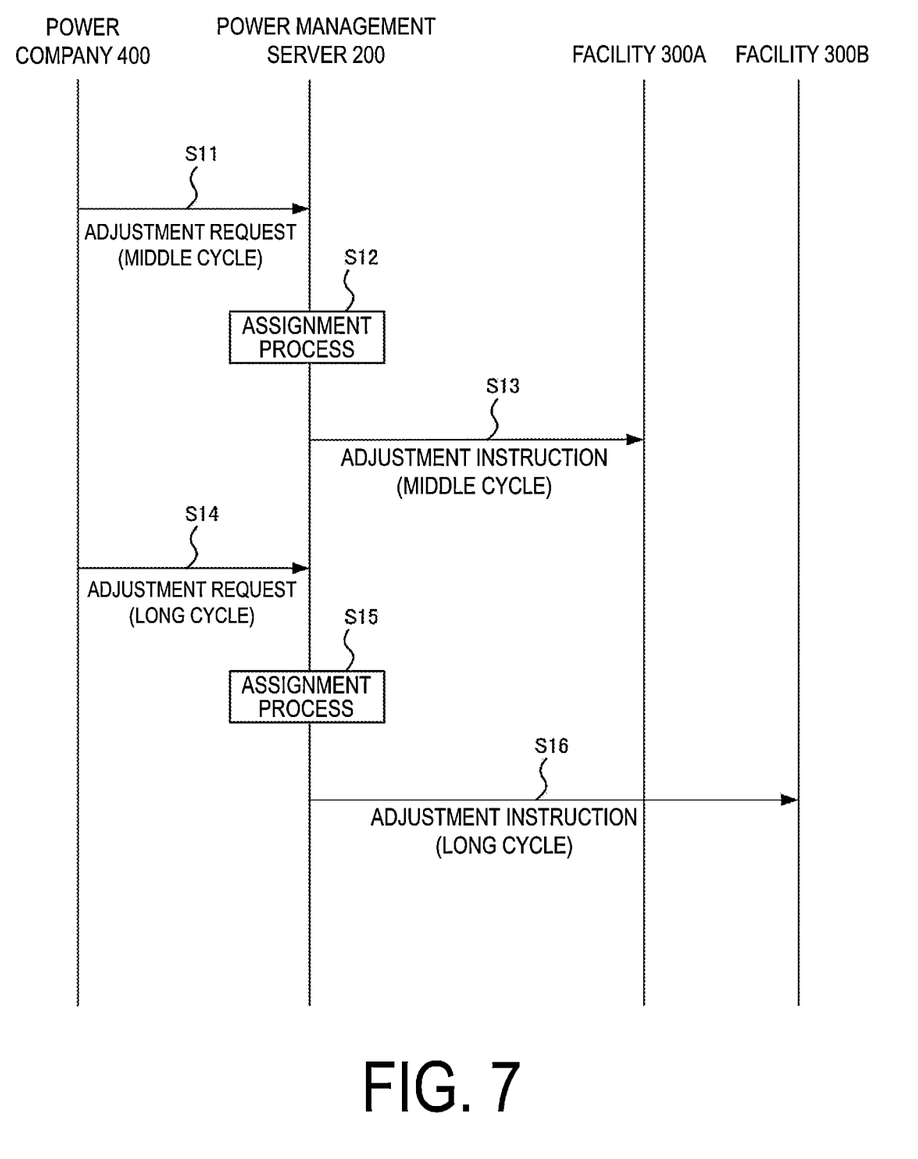
FIG. 7 is a diagram illustrating a power management method according to the embodiment.

As illustrated in FIG. 7, in step S11, the power management server 200 receives, from the power company 400, an adjustment request in which the fluctuation cycle of the adjustment target is the middle cycle.

In step S12, the power management server 200 determines the adjustment power supply to which the adjustment instruction is to be transmitted. Here, the description will be continued assuming that the adjustment power supply to which the adjustment instruction is to be transmitted is the adjustment power supply in the facility 300A.

In step S13, the power management server 200 transmits, to the facility 300A, an adjustment instruction in which the fluctuation cycle of the adjustment target is the middle cycle.

The facility 300A controls the adjustment power supply with the middle cycle control in response to the reception of the adjustment instruction.

In step S14, the power management server 200 receives, from the power company 400, an adjustment request in which the fluctuation cycle of the adjustment target is the long cycle.

In step S15, the power management server 200 determines the adjustment power supply to which the adjustment instruction is to be transmitted based on the correspondence relationship managed by the management unit 210. Here, since the adjustment instruction has not been transmitted to the adjustment power supply in the facility 300B, the description will be continued assuming that the adjustment power supply to which the adjustment instruction is to be transmitted is the adjustment power supply in the facility 300B.

In step S16, the power management server 200 transmits, to the facility 300B, an adjustment instruction in which the fluctuation cycle of the adjustment target is the long cycle. The facility 300B controls the adjustment power supply with the long cycle control in response to the reception of the adjustment instruction.

Second, a case will be exemplified in which the additional adjustment instruction is transmitted to an adjustment power supply to which the adjustment instruction has been transmitted.

Figure 8:
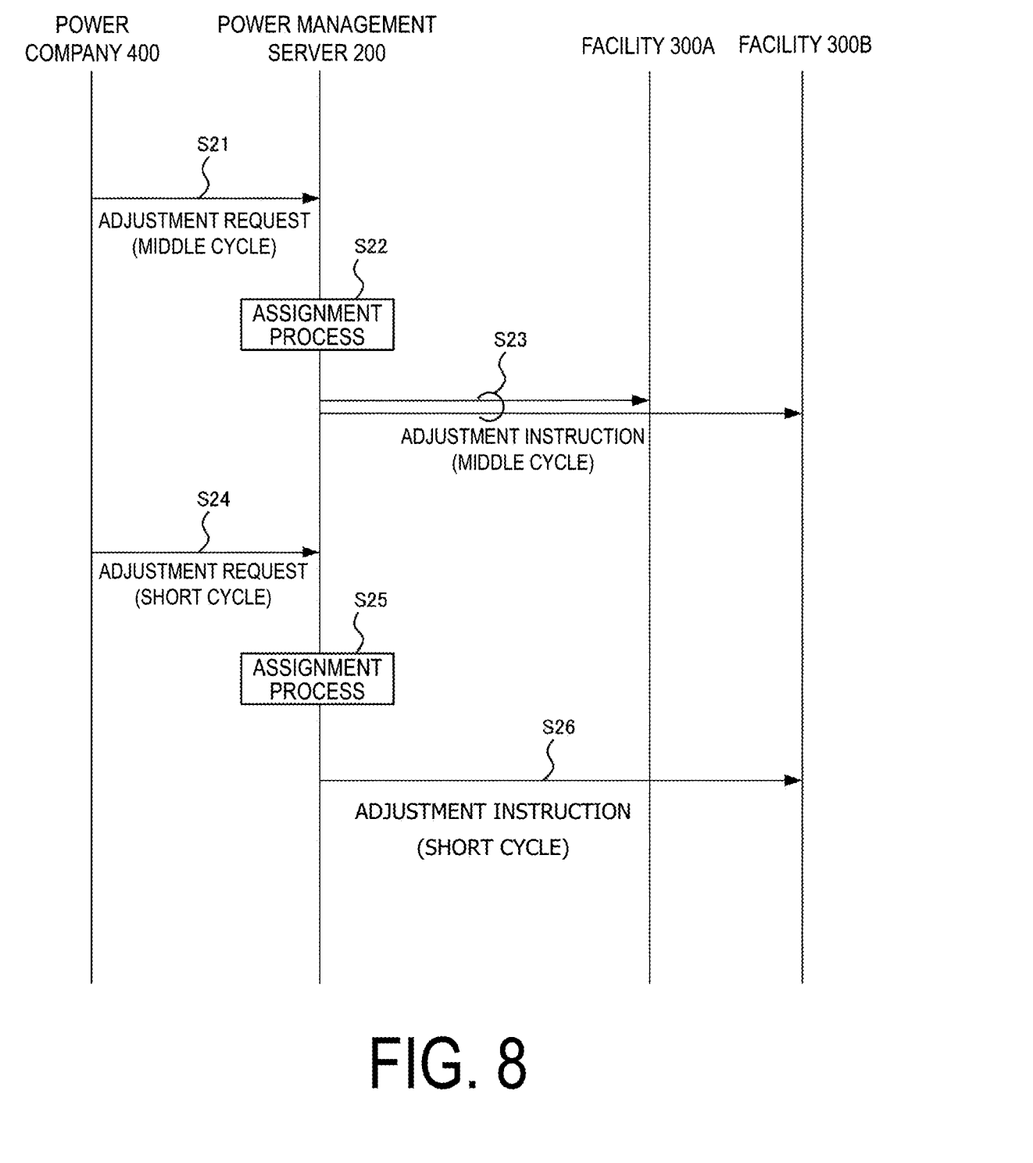
FIG. 8 is a diagram illustrating the power management method according to the embodiment.

As illustrated in FIG. 8, in step S21, the power management server 200 receives, from the power company 400, an adjustment request in which the fluctuation cycle of the adjustment target is the middle cycle.

In step S22, the power management server 200 determines the adjustment power supply to which the adjustment instruction is to be transmitted. Here, the description will be continued assuming that the adjustment power supplies to which the adjustment instruction is to be transmitted are the adjustment power supplies in the facilities 300A and 300B.

In step S23, the power management server 200 transmits, to the facilities 300A and 300B, an adjustment instruction in which the fluctuation cycle of the adjustment target is the middle cycle. The facilities 300A and 300B control the adjustment power supply with the middle cycle control in response to the reception of the adjustment instruction.

In step S24, the power management server 200 receives, from the power company 400, an adjustment request in which the fluctuation cycle of the adjustment target is the short cycle.

In step S25, the power management server 200 determines the adjustment power supply to which the adjustment instruction is to be transmitted based on the correspondence relationship managed by the management unit 210. Here, since the adjustment instruction of the middle cycle longer than the short cycle has been transmitted to the facility 300B, the description will be continued assuming that the adjustment power supply to which the adjustment instruction is to be transmitted is the adjustment power supply in the facility 300B. However, the adjustment power supply to which the adjustment instruction is to be transmitted may be the adjustment power supply in the facility 300A.

In step S26, the power management server 200 transmits, to the facility 300B, an adjustment instruction in which the fluctuation cycle of the adjustment target is the short cycle. The facility 300B changes the control of the adjustment power supply from the middle cycle control to the short cycle control in response to the reception of the adjustment instruction.

Third, a case will be described in which the power management server 200 autonomously determines that the additional adjustment is required.

Figure 9:
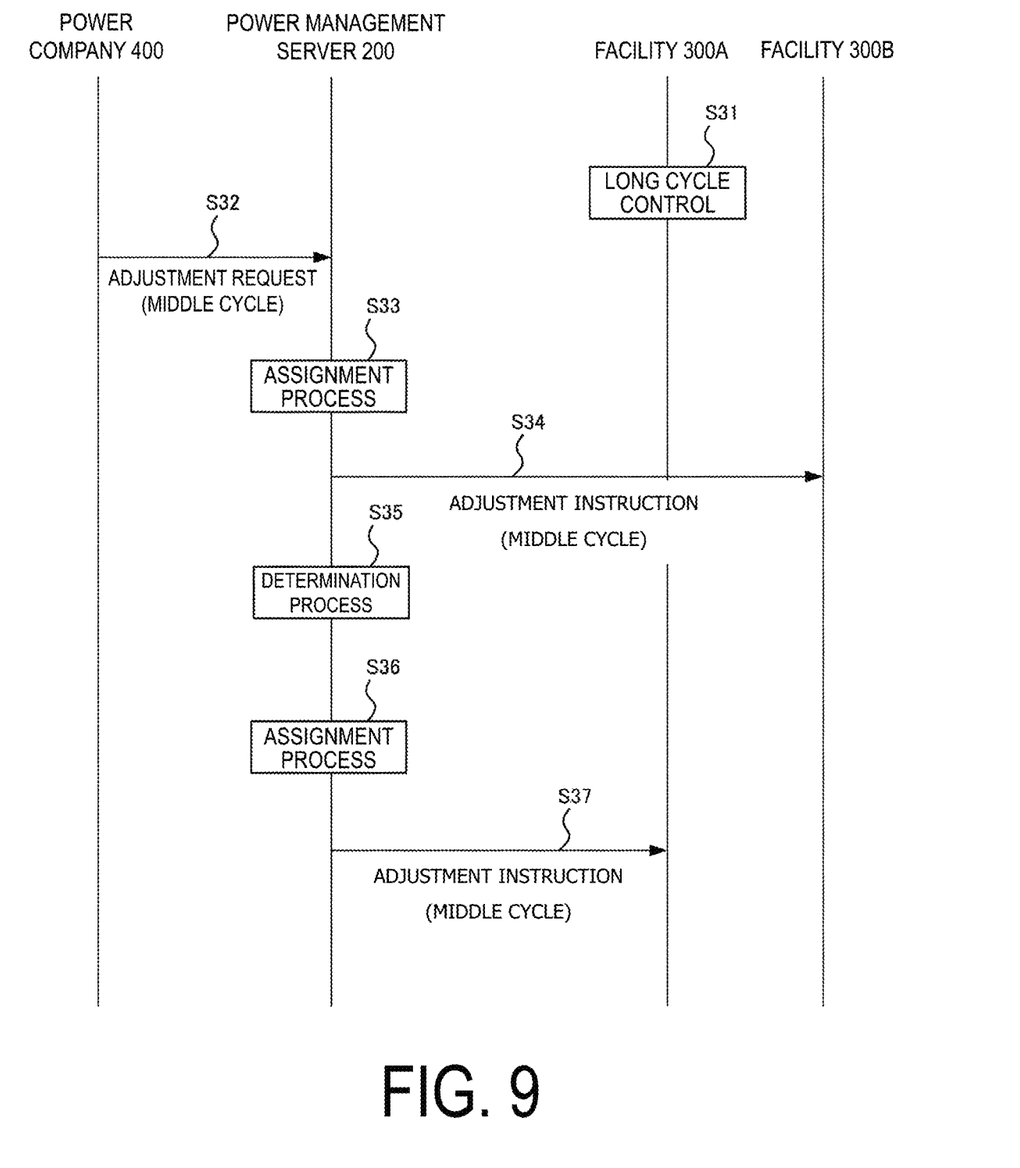
FIG. 9 is a diagram illustrating the power management method according to the embodiment.

As illustrated in FIG. 9, in step S31, the facility 300A performs the long cycle control.

In step S32, the power management server 200 receives, from the power company 400, an adjustment request in which the fluctuation cycle of the adjustment target is the middle cycle.

In step S33, the power management server 200 determines the adjustment power supply to which the adjustment instruction is to be transmitted based on the correspondence relationship managed by the management unit 210. Here, since the adjustment instruction has not been transmitted to the adjustment power supply in the facility 300B, the description will be continued assuming that the adjustment power supply to which the adjustment instruction is to be transmitted is the adjustment power supply in the facility 300B.

In step S34, the power management server 200 transmits, to the facility 300B, an adjustment instruction in which the fluctuation cycle of the adjustment target is the middle cycle. The facility 300B controls the adjustment power supply with the middle cycle control in response to the reception of the adjustment instruction.

In step S35, the power management server 200 determines whether the additional adjustment is required. Here, the description will be continued assuming that the additional adjustment is determined to be required. As described above, in a case where the fluctuation adjustment of the frequency of the power grid is determined to be insufficient based on the monitoring result of the frequency of the power grid 110, the fluctuation adjustment of the frequency of the power grid 110 is determined to be insufficient. The monitoring result may be obtained by the power management server 200 directly monitoring the frequency of the power grid 110, or may be obtained from a result of monitoring the frequency of the power grid 110 by each facility 300. The monitoring result may be obtained by a report described in a modification example 1 described below.

In step S36, the controller 230 determines the adjustment power supply to which the adjustment instruction is to be transmitted based on the correspondence relationship managed by the management unit 210. Here, since the adjustment instruction of the long cycle longer than the middle cycle has been transmitted to the facility 300A, the description will be continued assuming that the adjustment power supply to which the adjustment instruction is to be transmitted is the adjustment power supply in the facility 300A.

In step S37, the controller 230 transmits, to the facility 300A, an adjustment instruction in which the fluctuation cycle of the adjustment target is the middle cycle. The facility 300A changes the control of the adjustment power supply from the long cycle control to the middle cycle control in response to the reception of the adjustment instruction.

Actions and Effects

In the embodiment, in a case where the additional adjustment of the frequency of the power grid 110 is required, the power management server 200 determines the adjustment power supply to which the additional adjustment instruction is to be transmitted based on the correspondence relationship managed by the management unit 210. According to such a configuration, an influence on the control based on the already transmitted adjustment instruction can be suppressed, and the frequency of the power grid 110 can be appropriately adjusted.

For example, in the power management server 200, the controller 230 may determine the adjustment power supply to which the adjustment instruction has not been transmitted as an adjustment power supply to which the additional adjustment instruction is to be transmitted. According to such a configuration, since the adjustment power supply to which the adjustment instruction has not been transmitted is added, the influence on the control of the fluctuation adjustment of the frequency of the power grid 110 can be suppressed.

For example, in a case where the fluctuation cycle of the adjustment target required in the additional adjustment is the first cycle, the power management server 200 may determine an adjustment power supply to which an adjustment instruction for instructing a second cycle longer than the first cycle as the fluctuation cycle of the adjustment target is transmitted as an adjustment power supply to which the additional adjustment instruction is to be transmitted. According to such a configuration, since the fluctuation cycle adjusted by the adjustment power supply to which the adjustment instruction has been already transmitted is made shorter, the influence on the control of the fluctuation adjustment of the frequency of the power grid 110 can be suppressed as compared with the case where the fluctuation cycle adjusted by the adjustment power supply to which the adjustment instruction has been already transmitted is made longer.

Modification Example 1

Modification example 1 of the embodiment will be described below. In the following, differences from the embodiment will be described.

Although not specifically mentioned in the embodiment, in a modification example 1, the communicator 220 of the power management server 200 receives, from the adjustment power supply, a report including the adjustment result of the frequency of the power grid 110. The communicator 220 may receive the report from the facility 300. The adjustment result may include an information element indicating whether the frequency of the power grid 110 has been adjusted based on the adjustment instruction. The adjustment result may include a state of the frequency of the power grid 110. The adjustment result may include an information element indicating whether the adjustment power supply has been controlled based on the adjustment instruction. The adjustment result may include an information element indicating an operating state of the adjustment power supply.

In such a case, the communicator 220 receives, from a first adjustment power supply (facility 300) to which the first cycle has been instructed as the fluctuation cycle of the adjustment target, the report including the adjustment result of the frequency of the power grid 110 at a first time interval. On the other hand, the communicator 220 receives, from a second adjustment power supply (facility 300) to which the second cycle longer than the first cycle has been instructed as the fluctuation cycle of the adjustment target, the report including the adjustment result of the frequency of the power grid 110 at a second time interval longer than the first time interval.

For example, the facility 300 including the adjustment power supply to which the short cycle control is instructed transmits the report to the power management server 200 at a short time interval. The facility 300 including the adjustment power supply to which the middle cycle control is instructed transmits the report to the power management server 200 at a middle time interval longer than the short time interval. The facility 300 including the adjustment power supply to which the long cycle control is instructed transmits the report to the power management server 200 at a long time interval longer than the middle time interval.

Here, the short time interval may be shorter than the short cycle of the adjustment target in the short cycle control. Similarly, the middle time interval may be shorter than the middle cycle of the adjustment target in the middle cycle control. The long time interval may be shorter than the long cycle of the adjustment target in the long cycle control.

Power Management Method

A power management method according to the embodiment will be described below. Here, a case is exemplified in which the adjustment instruction is transmitted for each facility 300 and the report is transmitted for each facility 300.

Figure 10:
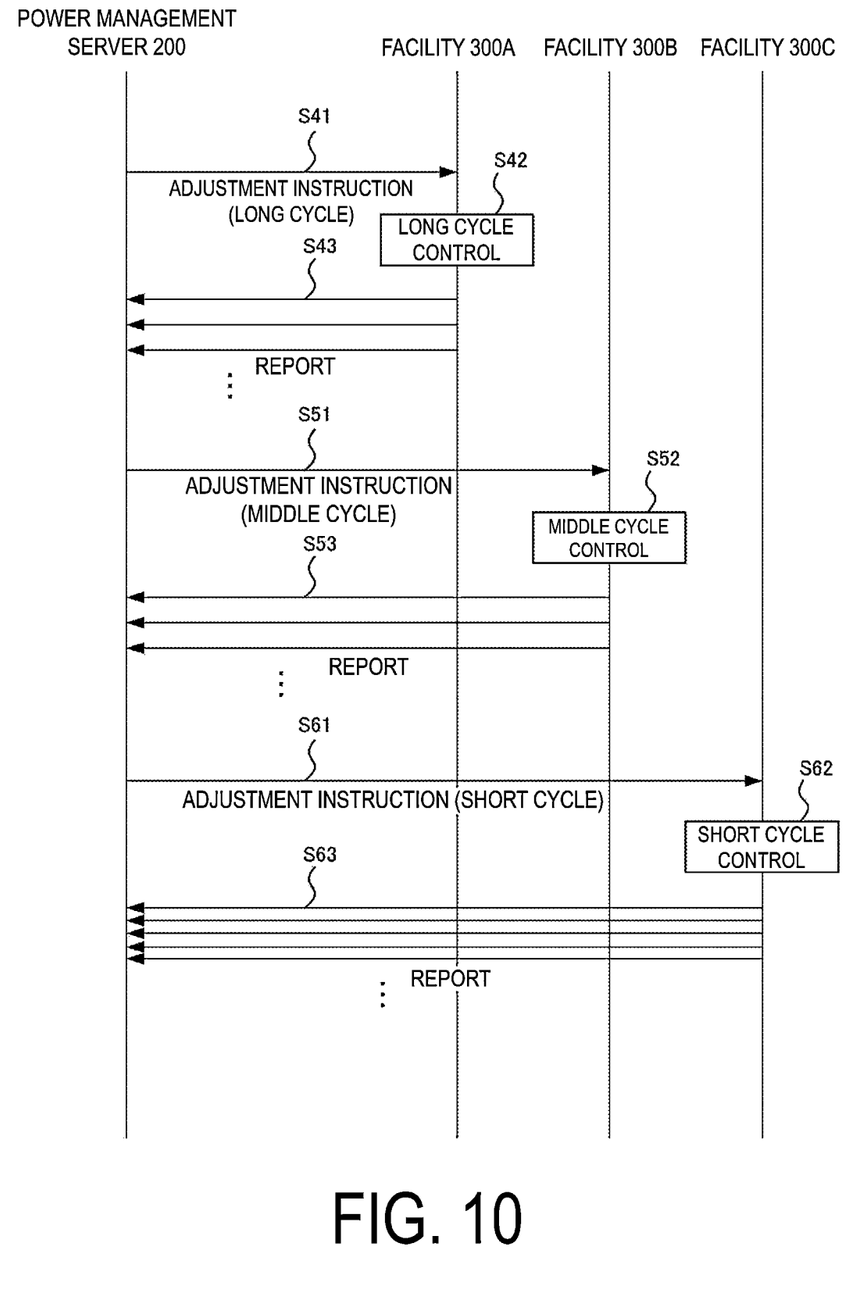
FIG. 10 is a diagram illustrating the power management method according to the embodiment.

As illustrated in FIG. 10, in step S41, the power management server 200 transmits, to the facility 300A, an adjustment instruction in which the fluctuation cycle of the adjustment target is the long cycle.

In step S42, the facility 300A controls the adjustment power supply with the long cycle control in response to the reception of the adjustment instruction.

In step S43, the facility 300A transmits, to the power management server 200, a report including the adjustment result of the frequency of the power grid 110 at the long time interval. In other words, the power management server 200 receives, from the facility 300A, the report at the long time interval.

In step S51, the power management server 200 transmits, to the facility 300B, an adjustment instruction in which the fluctuation cycle of the adjustment target is the middle cycle.

In step S52, the facility 300B controls the adjustment power supply with the middle cycle control in response to the reception of the adjustment instruction.

In step S53, the facility 300B transmits, to the power management server 200, the report including the adjustment result of the frequency of the power grid 110 at the middle time interval. In other words, the power management server 200 receives, from the facility 300B, the report at the middle time interval.

In step S61, the power management server 200 transmits, to the facility 300C, an adjustment instruction in which the fluctuation cycle of the adjustment target is the short cycle.

In step S62, the facility 300C controls the adjustment power supply with the short cycle control in response to the reception of the adjustment instruction.

In step S63, the facility 300C transmits, to the power management server 200, the report including the adjustment result of the frequency of the power grid 110 at the short time interval. In other words, the power management server 200 receives, from the facility 300C. the report at the short time interval.

Actions and Effects

In the embodiment, the power management server 200 receives, from the first adjustment power supply (facility 300) to which the first cycle has been instructed, the report at the first time interval, and receives, from the second adjustment power supply (facility 300) to which the second cycle longer than the first cycle has been instructed, the report at the second time interval longer than the first time interval. According to such a configuration, the appropriate control based on the report can be performed while suppressing excessive communication between the power management server 200 and the facility 300 (adjustment power supply).

Other Embodiments

Although the present disclosure has been described by the above-described embodiment, it should be understood that the description and the drawings which form a part of this disclosure do not limit this disclosure. Various alternative embodiments, examples, and operational techniques will be apparent from this disclosure to those skilled in the art.

In the embodiment, the local controller 360 provided in the facility 300 communicates with the power management server 200. However, the embodiment is not limited to this example. The adjustment power supply provided in the facility 300 may directly communicate with the power management server 200.

In the embodiment, the solar cell apparatus 310 has been exemplified as the adjustment power supply that outputs power by utilizing natural energy. However, the embodiment is not limited to this example. The adjustment power supply that outputs power by utilizing natural energy may include one or more adjustment power supplies selected from a wind power generation apparatus, a water power generation apparatus, a geothermal power generation apparatus, and the biomass power generation apparatus.

In the embodiment, the case has been exemplified in which each adjustment power supply includes an individual PCS. However, the embodiment is not limited to this example. One multi-DC link PCS may be provided for the two or more adjustment power supplies.

In an embodiment, the case has been exemplified in which the local controller 360 is provided in the facility 300. However, the embodiment is not limited to this example. The local controller 360 may be provided by a cloud service.

Although not specifically mentioned in the embodiment, the electric power may be an instantaneous value (kW) or an integrated value per unit time (kWh).

Note that the contents of JP 2019-175501 (filed on Sep. 26, 2019) are incorporated herein by reference in its entirety.

The invention claimed is:

1. A power management server, comprising:
   a receiver configured to receive, from an upper management server, an adjustment request for requesting a fluctuation adjustment of a frequency of a power grid for each fluctuation cycle of an adjustment target;
   a transmitter configured to transmit, to an adjustment power supply, an adjustment instruction for instructing the fluctuation adjustment of the frequency of the power grid according to the fluctuation cycle of the adjustment target requested by the adjustment request;
   a management unit configured to manage a correspondence relationship between the fluctuation cycle of the adjustment target instructed by the adjustment instruction and the adjustment power supply; and
   a controller configured to determine an adjustment power supply to which the adjustment instruction is to be transmitted based on the correspondence relationship,
   wherein, in a case where an additional adjustment of the frequency of the power grid is required, the controller determines a further adjustment power supply to which an additional adjustment instruction is to be transmitted based on the correspondence relationship.

2. The power management server according to claim 1, wherein
   the controller determines the adjustment power supply to which the adjustment instruction has not been transmitted, as the further adjustment power supply to which the additional adjustment instruction is to be transmitted.

3. The power management server according to claim 1, wherein
   in a case where a fluctuation cycle of the adjustment target required in the additional adjustment is a first cycle, the controller determines an adjustment power supply to which the adjustment instruction for instructing a second cycle longer than the first cycle as the fluctuation cycle of the adjustment target is transmitted, as the further adjustment power supply to which the additional adjustment instruction is to be transmitted.

4. The power management server according to claim 1, wherein
   in a case where the controller receives, from the upper management server, an additional adjustment request, the controller determines that the additional adjustment is required.

5. The power management server according to claim 1, wherein
   in a case where the controller determines that the fluctuation adjustment of the frequency of the power grid is insufficient based on a monitoring result of the frequency of the power grid, the controller determines that the additional adjustment is required.

6. The power management server according to claim 1, wherein the receiver receives,
   from a first adjustment power supply to which a first cycle is instructed as the fluctuation cycle of the adjustment target, a report comprising an adjustment result of the frequency of the power grid at a first time interval, and
   from a second adjustment power supply to which a second cycle longer than the first cycle is instructed as the fluctuation cycle of the adjustment target, a report comprising an adjustment result of the frequency of the power grid at a second time interval longer than the first time interval.

7. A power management method, comprising:
   receiving, from an upper management server, an adjustment request for requesting a fluctuation adjustment of a frequency of a power grid for each fluctuation cycle of an adjustment target;
   transmitting, to an adjustment power supply, an adjustment instruction for instructing the fluctuation adjustment of the frequency of the power grid according to the fluctuation cycle of the adjustment target requested by the adjustment request;
   managing a correspondence relationship between the fluctuation cycle of the adjustment target instructed by the adjustment instruction and the adjustment power supply; and
   determining an adjustment power supply to which the adjustment instruction is to be transmitted based on the correspondence relationship,
   wherein, in a case where an additional adjustment of the frequency of the power grid is required, the method further includes determining a further adjustment power supply to which an additional adjustment instruction is to be transmitted based on the correspondence relationship.

8. A power management server, comprising:
   a receiver configured to receive, from an upper management server, an adjustment request for requesting a fluctuation adjustment of a frequency of a power grid for each fluctuation cycle of an adjustment target;
   a transmitter configured to transmit, to an adjustment power supply, an adjustment instruction for instructing the fluctuation adjustment of the frequency of the power grid according to the fluctuation cycle of the adjustment target requested by the adjustment request;
   a management unit configured to manage a correspondence relationship between the fluctuation cycle of the adjustment target instructed by the adjustment instruction and the adjustment power supply; and
a controller configured to determine an adjustment power supply to which the adjustment instruction is to be transmitted based on the correspondence relationship,
wherein the receiver receives,
   from a first adjustment power supply to which a first cycle is instructed as the fluctuation cycle of the adjustment target, a report comprising an adjustment result of the frequency of the power grid at a first time interval, and
   from a second adjustment power supply to which a second cycle longer than the first cycle is instructed as the fluctuation cycle of the adjustment target, a report comprising an adjustment result of the frequency of the power grid at a second time interval longer than the first time interval.

* * * * *